United States Patent [19]

Nielsen et al.

[11] Patent Number: 5,716,801
[45] Date of Patent: *Feb. 10, 1998

[54] METHOD FOR PRODUCTION OF A VEGETABLE PROTEIN HYDROLYZATE WITH PROTEASES

[75] Inventors: Per Munk Nielsen, Hillerød; Svend Eriksen, Allerød; Ole Regnar Hansen, Herlev; Svend Erik Kristensen, Værløse; Peter Hvass, Lyngby, all of Denmark

[73] Assignee: Novo Nordisk A/S, Bagsvaerd, Denmark

[ * ] Notice: The term of this patent shall not extend beyond the expiration date of Pat. No. 5,691,165.

[21] Appl. No.: 417,715

[22] Filed: Apr. 6, 1995

Related U.S. Application Data

[63] Continuation of Ser. No. 108,700, filed as PCT/DK92/00068 Mar. 6, 1992, published as WO92/15696 Sep. 17, 1992, abandoned.

[30] Foreign Application Priority Data

Mar. 7, 1991 [EP] European Pat. Off. ............ 91610013

[51] Int. Cl.$^6$ .................. C12P 21/06; C12N 9/56; A23L 1/20; A23J 1/00
[52] U.S. Cl. .................. 435/68.1; 426/44; 426/46; 426/49; 426/656; 435/222
[58] Field of Search .................. 435/68.1, 222; 426/46, 7, 656, 44, 49

[56] References Cited

U.S. PATENT DOCUMENTS

| | | | |
|---|---|---|---|
| 3,753,728 | 8/1973 | Bedenk et al. | 426/44 |
| 4,100,024 | 7/1978 | Alder-Nissen et al. | 435/68.1 |
| 4,100,151 | 7/1978 | Adler-Nissen | 435/68.1 |
| 4,107,334 | 8/1978 | Jolly | 426/7 |
| 4,324,805 | 4/1982 | Olsen | 426/45 |
| 4,411,915 | 10/1983 | Eriksson | 426/32 |
| 4,431,629 | 2/1984 | Olsen | 426/46 |
| 4,478,856 | 10/1984 | Alder-Nissen et al. | 426/46 |
| 4,478,939 | 10/1984 | Adler-Nissen et al. | 435/200 |
| 4,478,940 | 10/1984 | Alder-Nissen et al. | 435/209 |
| 4,482,574 | 11/1984 | Lee | 426/7 |
| 4,632,903 | 12/1986 | Boyce et al. | 435/69 |
| 4,820,527 | 4/1989 | Christensen et al. | 426/2 |
| 4,847,096 | 7/1989 | Mellquist et al. | 426/41 |
| 4,904,483 | 2/1990 | Christensen et al. | 426/44 |
| 4,959,350 | 9/1990 | Frokjaer et al. | 514/2 |
| 4,990,344 | 2/1991 | Euber et al. | 426/28 |
| 5,021,338 | 6/1991 | Gianna et al. | 435/68.1 |
| 5,039,420 | 8/1991 | Klein et al. | 210/645 |
| 5,082,672 | 1/1992 | Hamada et al. | 426/7 |

FOREIGN PATENT DOCUMENTS

| | | |
|---|---|---|
| 0 238 946 | 9/1987 | European Pat. Off. |
| 2 076 825 | 12/1981 | United Kingdom. |
| 2 216 386 | 10/1989 | United Kingdom. |

OTHER PUBLICATIONS

Cheremisinoff et al. (Eds), *Biotechnology: Applications & Research*, Published by Technomic Publishing Company, Inc., pp. 541–562, 1985.
Derwent Japanese Publications Ltd., London; Abstract No. JP-A-61,254,153, Fiji Oil Co., Ltd., 1986.

*Primary Examiner*—David M. Naff
*Attorney, Agent, or Firm*—Steve T. Zelson, Esq.; Valeta Gregg, Esq.

[57] ABSTRACT

A well tasting and organoleptically acceptable vegetable protein hydrolyzate such as soy, pea or rice protein hydrolyzate is produced in high yield by a method using a combination of non-pH-stat hydrolysis and ultrafiltration. Preferably, the method is carried out by mixing a material containing at least 65% vegetable protein as dry matter and water to form a slurry containing a vegetable protein content of about 7–20%, heating the slurry to above 60° C., adjusting the pH of the slurry to about 8.5, hydrolyzing the slurry with at least two different proteases to a degree of hydrolysis of between 15 and 35% without adjusting the pH during hydrolysis to produce a hydrolyzed slurry, inactivating the proteases and separating the hydrolyzed slurry with an ultrafiltration unit having a cut-off value above 5,000 to form a permeate containing the vegetable protein hydrolyzate. One protease may be obtained from *B. Licheniformis* and the other from *B. Subtilis*. The hydrolyzed slurry or the permeate may be treated with activated carbon, and the permeate may be concentrated by nanofiltration and/or by evaporation.

12 Claims, No Drawings

METHOD FOR PRODUCTION OF A VEGETABLE PROTEIN HYDROLYZATE WITH PROTEASES

CROSS-REFERENCES TO RELATED APPLICATIONS

This application is a continuation of application Ser. No. 08/108,700, filed Sep. 7, 1993, now abandoned, which is a 371 of PCT/DK92/00068, filed Mar. 6, 1992, published as WO92/15696 Sep. 17 1992.

BACKGROUND OF THE INVENTION

1. Field of the Invention

The invention comprises a method for production of a vegetable protein hydrolyzate.

2. Description of the Related Art

Methods of this kind usually comprise a hydrolysis and a posttreatment in order to purify the protein hydrolyzate. An example of the hydrolysis appears from U.S. Pat. Nos. 4,324,805 and 4,100,024, and an example of the posttreatment appears from American Chemical Society Symposium No. 154, Synthetic Membranes, Vol. II, Hyper- and Ultrafiltration Uses.

Many methods for production of a protein hydrolyzate with good organoleptic properties can be carried out with a low yield only. Thus, it is the purpose of the invention to indicate a method for production of a protein hydrolyzate with good organoleptic properties, which can be carried out with a relatively high yield.

SUMMARY OF THE INVENTION

Surprisingly, according to the invention it has been found that a certain combination of a non-pH-stat hydrolysis and an ultrafiltration provides a process for production of a well tasting and organoleptically acceptable product in high yield.

DESCRIPTION OF THE PREFERRED EMBODIMENTS

Thus, the method according to the invention for production of a protein hydrolyzate is characterized by the fact 1) that a vegetable protein product with at least 65% protein calculated as dry matter and water is mixed to a slurry with a protein content up to about 20%, preferably up to 12%,
2) that the mixture from step 1) by means of at least one protease is proteolytically hydrolyzed by means of a non-pH-stat method to a DH of between 15 and 35%,
3) that the hydrolysis is terminated by inactivation of the enzyme(s), and
4) that the mixture from step 3 is separated on an ultrafiltration unit with cut-off value above 5,000, the permeate constituting the protein hydrolyzate.

It is to be understood that the vegetable protein product used as raw material in step 1 can be any vegetable protein product, e.g. soy protein, sesame protein, pea protein, rice protein, rape seed protein, and faba bean protein, provided that the protein content thereof is at least 65% calculated as dry matter, i.e. vegetable protein concentrates (with a protein content of above 70% calculated as dry matter), or vegetable protein isolates (with a protein content of above 90% calculated as dry matter).

In regard to step 2) it is preferred to conduct the hydrolysis at pH values and temperatures close to the optimum pH values and temperatures for the protease(s).

Also, it is to be understood that step 3) can be omitted, if the enzyme(s) is (are) retained in the retentate of step 4).

A preferred embodiment of the method according to the invention comprises that the vegetable protein product is a vegetable protein concentrate. Vegetable protein concentrates, e.g. soy protein concentrates, are commercially available standard products.

A preferred embodiment of the method according to the invention comprises that the vegetable protein product is a vegetable protein isolate. Vegetable protein isolates, e.g. soy protein isolates, are commercially available standard products of high purity.

A preferred embodiment of the method according to the invention comprises that the vegetable protein is soy, pea or rice protein. These vegetable proteins are available commercially as concentrates.

A preferred embodiment of the method according to the invention comprises that the slurry in step 1) has a protein content of 7–12%. In this manner the equipment is utilized optimally, and also, the viscosity is not too high for handling.

A preferred embodiment of the method according to the invention comprises that a heat treatment to a temperature above 60° C. is inserted between step 1) and step 2). In this manner the protein is effectively denatured, and thus, the subsequent hydrolysis will proceed rapidly. Also, the microbial stability during the hydrolysis, which can last for several hours, is secured effectively.

A preferred embodiment of the method according to the invention comprises that the hydrolysis in step 2) is carried out to a DH of between 20–30 and that Alcalase® (*B. licheniformis*) and/or Neutrase® (*B. subtilis*) is used as proteolytic enzyme(s). It is especially preferred to use Alcalase® (with a high pH optimum) first, and then Neutrase® (with a lower pH optimum). This method is especially well suited to the non-pH-stat-method used according to the invention.

A preferred embodiment of the method according to the invention comprises that the inactivation of the enzyme(s) (step 3)) is carried out by heat treatment. This inactivation is especially well suited in case the pH of the final protein hydrolyzate is supposed to be relatively high.

A preferred embodiment of the method according to the invention comprises that the inactivation of the enzyme(s) (step 3)) is carried out by acid treatment. This inactivation is especially well suited in case the pH of the final protein hydrolyzate is supposed to be relatively low.

A preferred embodiment of the method according to the invention comprises that the mixture at the end of step 3) is treated with activated carbon for more than 5 minutes at between 50° and 70° C. in an amount corresponding to between 1 and 5% carbon, calculated in relation to dry matter content. In this manner the color of the final protein hydrolyzate is improved, and also, the off-flavor is removed.

A preferred embodiment of the method according to the invention comprises that the permeate from step 4) is heated to between 130° and 140° C. and immediately thereafter flash cooled to around 75° C. and then cooled in a heat exchanger to between 50° and 60° C. In this manner the taste of the final protein hydrolyzate is improved, and also, the microbiological stability is secured.

A preferred embodiment of the method according to the invention comprises that after step 4) a concentration is carried out by nanofiltration at a temperature between 50° and 70° C. and/or evaporation, whereafter the retentate is collected as the protein hydrolyzate solution. By means of the nanofiltration a desalination can be carried out by proper selection of the membrane; besides nanofiltration is an inexpensive way for removal of water. Evaporation has the advantage of obtaining a high dry matter content in the concentrate before drying.

A preferred embodiment of the method according to the invention comprises that the protein hydrolyzate solution from step 4) is spray-dried to a water content below 6.5%. In this manner a stable product is obtained, both microbially and organoleptically.

Also, the vegetable protein hydrolyzate produced by means of the method according to the invention can be used as a nutrient, preferably as a nutritional additive to foods and beverages. Rat experiments have shown that the gastric emptying as well as absorption of protein from the intestinal tract was considerably faster with soy protein hydrolyzate produced according to the invention than with soy protein concentrate. Reference is made to Examples 6 and 7. Also, the soy protein hydrolyzate produced by means of the method according to the invention is expected to exhibit a beneficial effect on the N balance in humans, in comparison to the unhydrolyzed soy protein.

The method according to the invention will be illustrated in Examples 1–5, and the use of the vegetable protein hydrolyzate produced according to the invention will be illustrated in Examples 6–7.

EXAMPLE 1

Production of an acidic hydrolyzate from soy protein concentrate
Mixing 15 kg of soy protein concentrate Unico 75 (Loders Croklaan) containing 64.9% protein is mixed with water to a slurry with a protein content of 8.0%.
Heat treatment The mixture is heated to 85° C. and cooled again to 55° C. after a holding time of 1 minute.
Hydrolysis pH is adjusted to 8.5 with 4 N NaOH. The hydrolysis is carried out at 55° C. and is running for 18 hours. Hydrolysis is initiated by addition of Alcalase® 2.4 L. The dosage is 2.0% of the amount of protein. pH is monitored and when pH have decreased to <7.0 Neutrase® 0.5 L is added to the mixture. The dosage is 1.0% of the amount of protein.
Inactivation of enzyme After 18 hours the hydrolysis is terminated by lowering the pH to 4.2 by means of 30% HCl.
Separation of hydrolyzate The mixture is centrifuged to remove undissolved material (protein as well as other components). The supernatant is collected. The sludge from the centrifuge is resuspended to initital volume in order to wash out soluble protein. The suspension is centrifuged. To the supernatant from the two centrifugations activated carbon is added (Picatif FGV120). The dosage is 3% of dry matter measured as Brix. The mixture is ultrafiltered by means of a PCI module mounted with FP100 membranes having a cut-off value of 100,000. The temperature during the ultrafiltration is 55°–65° C. The volume of the carbon containing mixture is concentrated to one third and subsequently diafiltrered with two volumes of water. The ultrafiltration is terminated by a concentration step. The permeate is collected and the retentate discarded.
Flash The permeate from the ultrafiltration is heated to 135° C. by steam injection and flash cooled within few seconds to approx. 75° C. followed by cooling to 55° C. for further processing.

Nanofiltration

The effluent from the flash process is concentrated and desalinated by nanofiltration to a dry matter content of approx. 25% (30° Brix). Nanofiltration equipment was AFC30 membranes from PCI Membrane Systems. The low osmolality of 188 mOsm/kg measured at 7.5° Brix was obtained by diafiltration of 190 l of concentrate with 60 l water.
Sterilizing filtration To assure appropriate microbiological quality the concentrate from the nanofiltration is filtered at approx. 50° C. on Supra EKS sheets rinsed with citric acid solution (50 l/m² at pH 4.2) and deionized water to neutral pH before steaming.
Spray drying The filtrate is spray dried at an inlet temperature of 200° C. and an outlet temperature of 75° C. by means of a spray drying unit from Niro Atomizer with a capacity of approx. 2 l of evaporated water per hour.

EXAMPLE 2

Production of an acidic hydrolyzate from pea protein isolate
Mixing 9.6 kg of pea protein isolate (P-pro 2000 Nutrio/Danisco) containing 83.3% protein is mixed with water to a slurry with a protein content of 8.0%.
Heat treatment The mixture is heated to 85° C. and cooled again to 55° C. after a holding time of 1 minute.
Hydrolysis pH is adjusted to 8.5 with 4 N NaOH. The hydrolysis is carried out at 55° C. and is running for 18 hours. Hydrolysis is initiated by addition of Alcalase® 2.4 L. The dosage is 2.0% of the amount of protein. pH is monitored and when pH have decreased to <7.0 Neutrase® 0.5 L is added to the mixture. The dosage is 1.0% of the amount of protein.
Inactivation of enzyme After 18 hours the hydrolysis is terminated by lowering the pH to 4.2 by means of 30% HCl.
Separation of hydrolyzate To the hydrolyzate activated carbon is added (Picatif FGV120). The dosage is 3% of dry matter measured as Brix. The mixture is ultrafiltered by means of a PCI module mounted with FP100 membranes having a cut-off value of 100,000. The temperature during ultrafiltration is 55°–65° C. The volume of carbon containing mixture is concentrated to one third and subsequently diafiltered with two volumes of water. The ultrafiltration is terminated by means of a concentration step. The permeate is collected and the retentate discarded.
Flash The permeate from the ultrafiltration is heated to 135° C. by steam injection and flash cooled within few seconds to approx. 75° C. followed by cooling to 55° C. for further processing.
Nanofiltration The effluent from the flash process is concentrated and desalinated by nanofiltration to a dry matter content of approx. 25% (30° Brix). Nanofiltration equipment was AFC30 membranes from PCI Membrane Systems. The low osmolality of 180 mOsm/kg measured at 5.0% protein was obtained without diafiltration.
Sterilizing filtration To assure appropriate microbiological quality the concentrate from the nanofiltration is filtered at approx. 50° C. on Supra EKS sheets rinsed with citric acid solution (50 l/m² at pH 4.2) and deionized water to neutral pH before steaming. 22 kg of filtrate containing 22.0% protein was obtained after this step.

Spray drying

The filtrate is spray dried at an inlet temperature of 200° C. and an outlet temperature of 75° C. by means of a spray drying unit from Niro Atomizer with a capacity of approx. 2 l of evaporated water per hour.

EXAMPLE 3

Production of a neutral hydrolyzate from pea protein isolate

Mixing 9.6 kg of pea protein isolate (P-pro 2000 Nutrio/Danisco) containing 83.3% protein is mixed with water to a slurry with a protein content of 8.0%.

Heat treatment

The mixture is heated to 85° C. and cooled again to 55° C. after a holding time of 1 minute.

Hydrolysis pH is adjusted to 8.5 with 4 N NaOH. The hydrolysis is carried out at 55° C. and is running for 18 hours. Hydrolysis is initiated by addition of Alcalase® 2.4 L. The dosage is 2.0% of the amount of protein. pH is monitored and when pH have decreased to <7.0 Neutrase® 0.5 L is added to the mixture. The dosage is 1.0% of the amount of protein.

Inactivation of enzyme

After 18 hours the hydrolysis is terminated by heating to 85° C., by holding this temperature for 3 minutes, and by cooling to 55° C.

Separation of hydrolyzate

To the hydrolyzate activated carbon is added (Picatif FGV120). The dosage is 3% of dry matter measured as °Brix. The mixture is ultrafiltered by means of a PCl module mounted with FP100 membranes having a cut-off value of 100.000. The temperature during ultrafiltration is 55°–65° C. The volume of carbon containing mixture is concentrated to one third and subsequently diafiltered with two volumes of water. The ultrafiltration is terminated by a concentration step. The permeate is collected and the retentate discarded.

Flash

The permeate from the ultrafiltration is heated to 135° C. by steam injection and flash cooled within few seconds to approx. 75° C. followed by cooling to 55° C. for further processing.

Nanofiltration

The effluent from the flash process is concentrated and desalinated by nanofiltration to a dry matter content of approx. 25% (30° Brix). Nanofiltration equipment was AFC30 membranes from PCl Membrane Systems. The low osmolality of 161 mOsm/kg measured at 7.5° Brix was was obtained by diafiltration of 176 l of concentrate with 80 l of water. The diafiltration was carried out after concentration of the 176 l to 28 l.

Sterilizing filtration

To assure appropriate microbiological quality the concentrate from the nanofiltration is filtered at approx. 50° C. on Supra EKS sheets rinsed with citric acid solution (50 l/m$^2$ at pH 4.2) and deionized water to neutral pH before steaming.

Spray drying

The filtrate is spray dried at an inlet temperature of 200° C. and an outlet temperature of 75° C. by means of a spray drying unit from Niro Atomizer with a capacity of approx. 2 l of evaporated water per hour.

EXAMPLE 4

Production of a neutral hydrolyzate from pea protein isolate

The effluent from the flash in Example 3 is collected for concentration without desalination, i.e. by evaporation; it is concentrated in a rotary vacuum evaporator to a dry matter content of approx. 25%.

The concentrate is spray dried at an inlet temperature of 200° C. and an outlet temperature of 75° C. by means of a spray drying unit from Niro Atomizer with a capacity of approx. 2 l of evaporated water per hour.

EXAMPLE 5

Production of a neutral hydrolyzate from rice protein concentrate

Mixing 442.6 g of rice protein concentrate (REMY Industries, Belgium) containing 72.3% of protein (N*5.95) is mixed with water to a slurry with a protein content of 8.0%.

Hydrolysis pH is adjusted to 8.5 with 4 N NaOH. The hydrolysis is carried out at 55° C. and is running for 18 hours. Hydrolysis is initiated by addition of Alcalase® 2.4 L. The dosage is 2.0% of the amount of protein. pH is monitored and when pH have decreased to <7.0 Neutrase® 0.5 L is added to the mixture. The dosage is 1.0% of the amount of protein.

Inactivation of enzyme

After 18 hours the hydrolysis is terminated by heating to 85° C. by holding this temperature for 3 minutes, and by cooling to 55° C.

Separation of hydrolyzate

The hydrolyzate is centrifuged to remove suspended material. The supernatant is ultrafiltered by means of a Milipore lab module mounted with membranes having a cut-off value of 10.000. The temperature during the ultrafiltration is 25° C. The permeate is collected and the retentate discarded.

Nanofiltration

The effluent from the flash process is concentrated and desalinated by nanofiltration to a dry matter content of approx. 25% (30° Brix). Nanofiltration equipment was a Milipore lab module mounted with RO Membranes. The product is obtained as a nanofiltration concentrate.

In order to generate a better survey of all 5 examples reference is made to the below indicated table.

| | Ex. 1 | Ex. 2 | Ex. 3 | Ex. 4 | Ex. 5 |
|---|---|---|---|---|---|
| Parameters of processing | | | | | |
| DH in hydrolysis, % | 22.6 | 25.3 | 25.8 | 25.8 | 17.6 |
| Increase in osmolality during hydrolysis mOsm/kg | 209 | 183 | 182 | 182 | 164 |
| Properties of end product | | | | | |
| DH of product, % | 27.1 | 27.6 | 28.5 | 30.9 | 21.4 |
| pH of product (in solution with 5% protein) | 4.14 | 4.03 | 6.53 | 6.98 | 6.83 |
| Osmolality of product, mOsm/kg (in solution with 5% protein) | 195 | 180 | 150 | 172 | 153 |
| Protein content, % (N*6.25) | 77.1 | 89.8 | 91.2 | 89.0 | 7.8*) |
| Dry matter, % | 94.9 | 94.0 | 95.3 | 94.5 | 9.6 |
| Protein in d.m., % | 81.3 | 95.5 | 95.7 | 94.2 | 81.3 |
| Application of end product | | | | | |
| Dietary drinks with pH < 4.5 | + | + | − | − | − |
| Protein supplements, soft drinks drinks with pH < 4.5 | + | + | − | − | − |

-continued

|                                      | Ex. 1 | Ex. 2 | Ex. 3 | Ex. 4 | Ex. 5 |
|--------------------------------------|-------|-------|-------|-------|-------|
| Protein fortification of soups, fonds etc | –     | –     | +     | +     | +     |
| Dietary drinks at neutral pH         | –     | –     | +     | +     | +     |

*)Example 5 calculated as N*5.95

EXAMPLE 6

This example was designed to evaluate the gastrointestinal disappearance of soy protein concentrate, soy protein hydrolysate and a mixture of amino acids after gastric intubation in rats, maltodextrin being used as a control.

Test compounds

Four different test compounds were used for the study:

1. Soy protein concentrate (Unico 75, % of protein=66.6)

2. Soy protein hydrolysate produced as indicated in Example 1 (Pro up, % of protein=79.1)

3. Vaminolac (mixture of amino acids, % of protein=85.9)

4. Maltodextrin CPC 1908

Preparation of test compounds

Of each of the four test compounds a dose formulation was prepared by adding 0.9% sodium chloride solution to 3.5 g of the test compound until a volume of 17.5 ml.

Animals

Twenty male SPF rats (200–250 g) of the stock Mol-:WIST from the Møllegaard Breeding Centre ApS, Ejby, DK-4623 LI. Skensved, Denmark were used. Before dosing with the test compound, each rat had been starved for 24 hours. In order to prevent eating of bedding material, each rat was, while starved, kept in a cage with a wire grid floor.

Surgical preparation and dosing

Each rat was anaesthetized with an intraperitoneal dose (0.5 ml) of a short acting barbiturate (Brietal®).

Via an abdominal incision a ligature was placed at the ileum just before entering the large intestines. The incision was closed conventionally.

Immediately after the surgical preparation a volume of 2.5 ml of the test compound preparation was administered by gastric intubation with a blunt cannula.

Five rats were used for each of the preparations of the test compounds:

Collection of gastrointestinal contents

One hour after dosing, the rats were sacrificed and three peans were applied via the abdominal recision, one at the oesophagus just before entrance to the stomach and two at the gastroduodenal edge.

The ligated stomach and small intestines were flushed with 10 ml of 0.9% NaCl, which was collected in small plastic bottles.

Each bottle was analysed for content of protein (Kjeldahl analysis).

The results obtained are summarized in Table 1.

TABLE 1

Protein in stomach and small intestines of rats one hour after gastric intubation of maltodextrin, soy protein concentrate, soy protein hydrolysate and Vaminolac (amino acid mixture), 5 rats being used for each test compound

| Treatment | Dose*) g (found) | Stomach g | Stomach % of dose | Intestine g | Intestine % of dose | Total g | Total % of dose | Absorbed % of dose |
|-----------|------------------|-----------|-------------------|-------------|---------------------|---------|-----------------|---------------------|
| Maltodextrin | — | 0.02 | — | 0.04 | — | 0.06 | — |  |
| Soy protein concentrate | 0.29 | 0.23 | 79.3 | 0.06 | 20.7 | 0.30 | 103.4 | –21 |
| Soy protein hydrolysate | 0.37 | 0.17 | 45.9 | 0.08 | 21.6 | 0.26 | 70.3 | –49 |
| Vaminolac | 0.40 | 0.15 | 37.5 | 0.06 | 15.0 | 0.21 | 53.0 | –62 |

*) Protein in 2.5 ml dose formulation

In control animals (maltodextrin) very little protein (0.02 g) was found in the stomach. In the intestine 0.04 g of protein was found.

In the protein treated rats, the higher amount of stomach protein was found in the rats given soy protein concentrate (79.3% of the dose) and the lowest in the rats given Vaminolac (37.5% of the dose).

In all three groups of rats treated with protein, the amounts of protein in the intestine was about the same (0.06–0.08 g) and only very little higher than the content in the control rats.

This example shows that the stomach is emptying its content of protein relatively slowly after a gastric dose of soy protein concentrate. As little as 28% had disappeared from the stomach one hour after dosing. The emptying was considerably faster after the gastric dose of soy protein hydrolysate (about 59% had disappeared) and even faster after the gastric dose of Vaminolac (about 68% had disappeared). The amino acid mixture, however, is very expensive and tastes extremely bad. Thus, everything taken into consideration, the soy protein hydrolysate produced by means of the method according to the invention is the preferred nutrient.

The protein content of the small intestines was at the same level for all 3 protein products as in the control rats. Thus, the proteins emptied into the small intestines seem to be absorbed so readily that the intestinal content did not increase above the background level of control rats.

The results have shown that about 50% of the administered soy protein hydrolysate is absorbed within one hour in comparison to about 20% for soy protein concentrate and 62% for amino acid mixture, respectively.

Since gastric emptying was considerably faster after soy protein hydrolysate than after soy protein concentrate and all the proteins emptied into the intestines seem to be quickly absorbed, it is concluded that utilization of soy protein hydrolysate is quicker than utilization of soy protein concentrate, the reason being differences in gastric emptying rates.

EXAMPLE 7

This example was designed to evaluate the gastrointestinal disappearance of soy protein concentrate, soy protein hydrolysate and a mixture of amino acids after intraintestinal administration in rats.

Test compounds

Four different test compounds were used for the study:
1. Soy protein concentrate (Unico 75, % of protein=62.8)
2. Soy protein hydrolysate produced as indicated in Example 1 (Pro up, % of protein=82.54)
3. Vaminolac (mixture of amino acids, % of protein=84.5)
4. Maltodextrin CPC 1908

Preparation of test compounds

Of each of the four test compounds a dose formulation was prepared by adding 0.9% sodium chloride solution to 1.6 g of the test compound until a volume of 20.0 ml.

Animals

Twenty male SPF rats (about 150 g) of the stock Mol-:WIST from the Møllegaard Breeding Centre ApS, Ejby, DK-4623 Ll. Skensved, Denmark were used. Before dosing with the test compound, each rat had been starved for 24 hours. In order to prevent eating of bedding material, each rat was, while starved, kept in a cage with a wire grid floor.

Surgical preparation and dosing

Each rat was anaesthetized with an intraperitoneal dose (0.5 ml) of a short acting barbiturate (Brietal®).

Via an abdominal incision a ligature was placed at the gastroduodenal edge and at the ileum just before entering the large intestines. The incision was closed conventionally.

Immediately after the application of the ligatures a volume of 2.5 ml of the test compound preparation was administered by injection into the duodenum.

Five rats were used for each of the preparations of the test compounds:

Collection of intestinal contents

One hour after dosing, the rats were sacrificed.

The ligated small intestines were flushed with 10 ml of 0.9% NaCl, which was collected in small plastic bottles.

Each bottle was analysed for content of protein (Kjeldahl analysis).

The results obtained are summarized in Table 2.

TABLE 2

Protein in intestines of rats one hour after intraintestinal administration of maltodextrin, soy protein concentrate, soy protein hydrolysate and Vaminolac (amino acid mixture), 5 rats being used for each test compound

| Treatment | Dose (g protein) Given | Found* | Flush sample (g) | Intestinal protein g | % of dose | Absorbed % of dose |
|---|---|---|---|---|---|---|
| Maltodextrin | — | — | 9.79 | 0.036 | — | |
| Soy protein concentrate | 0.126 | 0.132 | 9.80 | 0.125 | 94.9 (70.6)** | 29.4 |
| Soy protein hydrolysate | 0.165 | 0.164 | 10.78 | 0.078 | 47.7 (25.5)** | 74.5 |
| Vaminolac | 0.169 | 0.170 | 11.48 | 0.079 | 46.2 (25.4)** | 74.6 |

*) Protein in 2.5 ml dose formulation
**) Percentage corrected for endogenous intestinal protein In control animals (maltodextrin) very little protein (0.036 g) was found in the intestine.

In the protein treated rats, the higher amount of intestinal protein was found in the rats given soy protein concentrate (94.9% of the dose) and the lowest in the rats given soy protein hydrolysate (47.7% of the dose) or Vaminolac (46.2% of the dose).

This demonstrates that the hydrolysate and Vaminolac were absorbed considerably faster than the concentrate and that the hydrolysate was absorbed as fast as Vaminolac.

We claim:

1. A method for producing a vegetable protein hydrolysate, comprising
   (a) mixing water and a vegetable protein product with at least 65% protein calculated as dry matter to form a slurry with a protein content of about 7 to about 20%;
   (b) heating the slurry to a temperature above 60° C.;
   (c) adjusting the pH of the slurry to about 8.5;
   (d) hydrolyzing said slurry with at least two different proteases, wherein said hydrolysis is conducted without adjusting the pH during the hydrolysis, and wherein a hydrolyzed mixture is formed which has a degree of hydrolysis of between 15 and 35%;
   (e) inactivating said proteases; and
   (f) subjecting the hydrolyzed mixture to ultrafiltration on an ultrafiltration unit with a cut-off value above 5.000 to form a permeate comprising the vegetable protein hydrolysate.

2. The method according to claim 1, wherein the vegetable protein product is a vegetable protein concentrate.

3. The method according to claim 1, wherein the vegetable protein product is a vegetable protein isolate.

4. The method according to claim 1, wherein the vegetable protein is soy, pea or rice protein.

5. The method according to claim 1, wherein the slurry has a protein content of 7–12%.

6. The method according to claim 1, wherein the hydrolyzed mixture has a degree of hydrolysis of between 20–30% and one of the proteases is derived from B. licheniformis and the other protease is derived from B. subtilis.

7. The method according to claims 1, wherein said proteases are inactivated by heating.

8. The method according to claims 1, wherein said proteases are inactivated by acid treatment.

9. The method according to claim 1, further comprising, after inactivating said proteases and prior to applying the hydrolyzed mixture to the ultrafiltration unit, treating the hydrolyzed mixture with activated carbon for more than 5 minutes at between 50° and 70° C. in an amount between 1 and 5% carbon, calculated in relation to dry matter content.

10. The method according to claim 1, further comprising heating the permeate to a temperature between 130° and 140° C. and immediately thereafter flash cooling the heated permeate to around 75° C. and then cooling to between 50° and 60° C. in a heat exchanger.

11. The method according to claim 1, further comprising concentrating the permeate by nanofiltration at a temperature between 50° and 70° C. to form a retentate comprising the protein hydrolysate and/or concentrating the permeate by evaporation.

12. The method according to claim 1, further comprising spray drying the permeate to a water content below 6.5%.

* * * * *